March 3, 1936.  F. W. BLACK ET AL  2,032,523
PIPE HANDLING EQUIPMENT
Filed April 5, 1933   5 Sheets-Sheet 2

INVENTORS
FRANK W. BLACK.
ROBERT E. LINDEMANN.
GEORGE M. SCHAULIN.
By Ely & Barrow
ATTORNEYS March 3, 1936.  F. W. BLACK ET AL  2,032,523
PIPE HANDLING EQUIPMENT
Filed April 5, 1933    5 Sheets-Sheet 3

INVENTORS
FRANK W. BLACK
ROBERT E. LINDEMANN
GEORGE M. SCHAULIN
ATTORNEYS

March 3, 1936.  F. W. BLACK ET AL  2,032,523
PIPE HANDLING EQUIPMENT
Filed April 5, 1933  5 Sheets-Sheet 4

INVENTORS
FRANK W. BLACK
ROBERT E. LINDEMANN
GEORGE M. SCHAULIN
BY Ely & Barrow
ATTORNEYS.

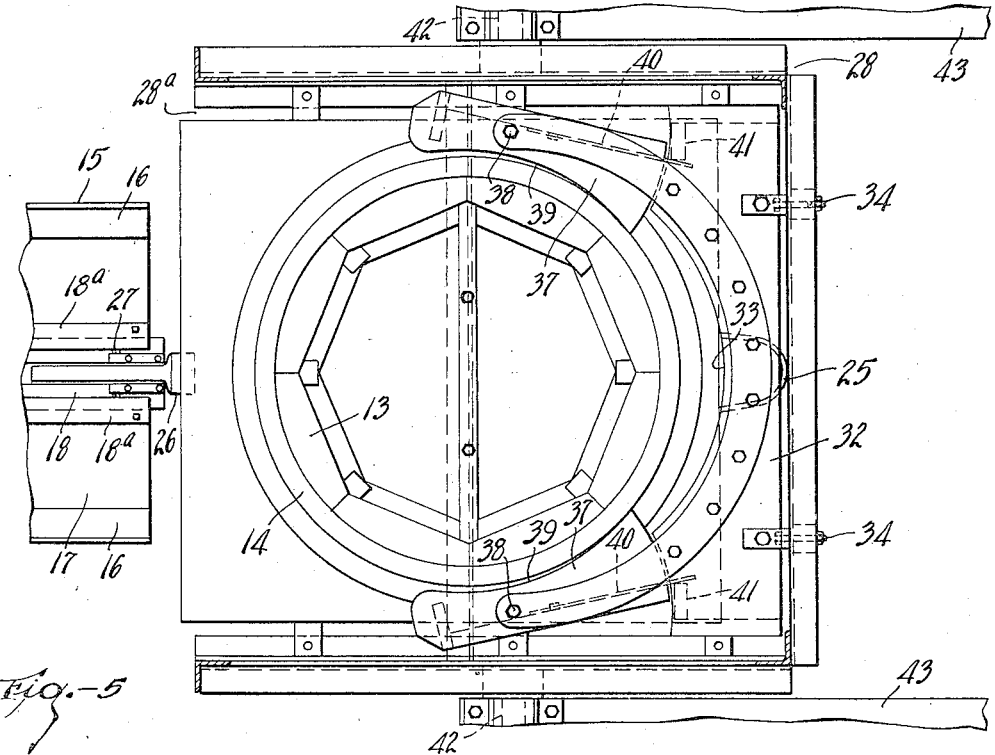
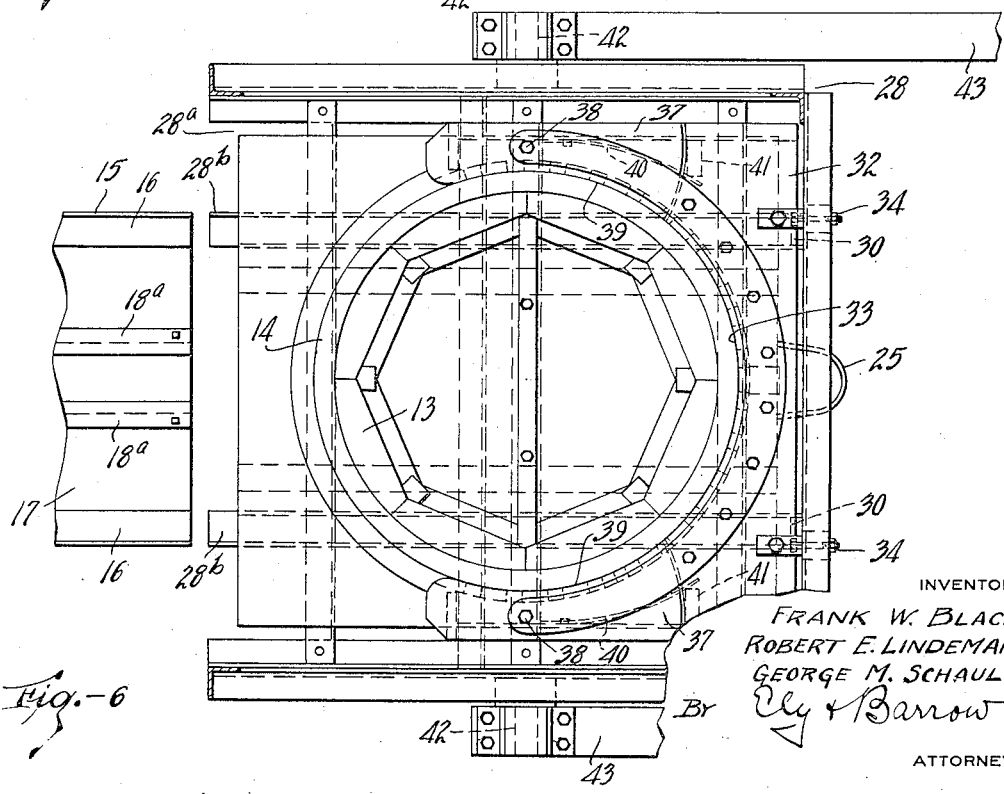

Patented Mar. 3, 1936

2,032,523

UNITED STATES PATENT OFFICE 2,032,523

PIPE HANDLING EQUIPMENT

Frank W. Black, Akron, Robert E. Lindemann, Barberton, and George M. Schaulin, Akron, Ohio, assignors to The Robinson Clay Product Company, Akron, Ohio, a corporation of Maine Application April 5, 1933, Serial No. 664,594

9 Claims. (Cl. 25—40)

This invention relates to pipe handling equipment for use in the manufacture of pipes or the like of clay or other plastic materials.

In the manufacture of clay pipe, it is desirable to provide equipment for receiving and conveying the pipe from the press quickly as it is formed and it is also desirable in the case of bell-ended pipes to turn the formed pipes so that they are supported on their plain ends while being hardened to prevent distortion of the bell-end of the pipes.

Heretofore, conveyor systems and pipe turning devices have been provided for handling clay pipe after it has been formed to shape from a plastic clay batch, but these devices have not been entirely satisfactory particularly because of slow operating speeds and distortion of the pipes in handling.

One purpose of the present invention is to provide in combination with a pipe or like forming press of a conveyor system for removing the pipe from the press as quickly as the pipe may be formed in said press.

Another purpose of the invention is to provide in association with such a conveyor system a pipe turning device which will remove the pipe from the conveyor system and reverse it with sufficient speed to permit the quick operation of the press and conveyor as set forth in the preceding paragraph.

A further purpose of the invention is to provide an improved cradle for a pipe turning apparatus which may or may not be used in association with the equipment described in the preceding paragraphs to permit turning of a pipe without distortion.

The foregoing and other objects of the invention are attained in the apparatus illustrated in the accompanying drawings and briefly described below. It is to be understood that the invention is not limited to the specific form thereof shown and described and that sub-combinations of the apparatus shown may be separately utilized to advantage in the handling of plastic pipes or like articles.

Of the accompanying drawings,

Figure 5 is an enlarged sectional view on line 5—5 of Figure 1 with a pipe shown as being advanced into the turner; and Figure 6 is a similar view showing the pipe positioned in the turner ready to be turned thereby and conveyed to the point of removal from the turner.

Figure 1:
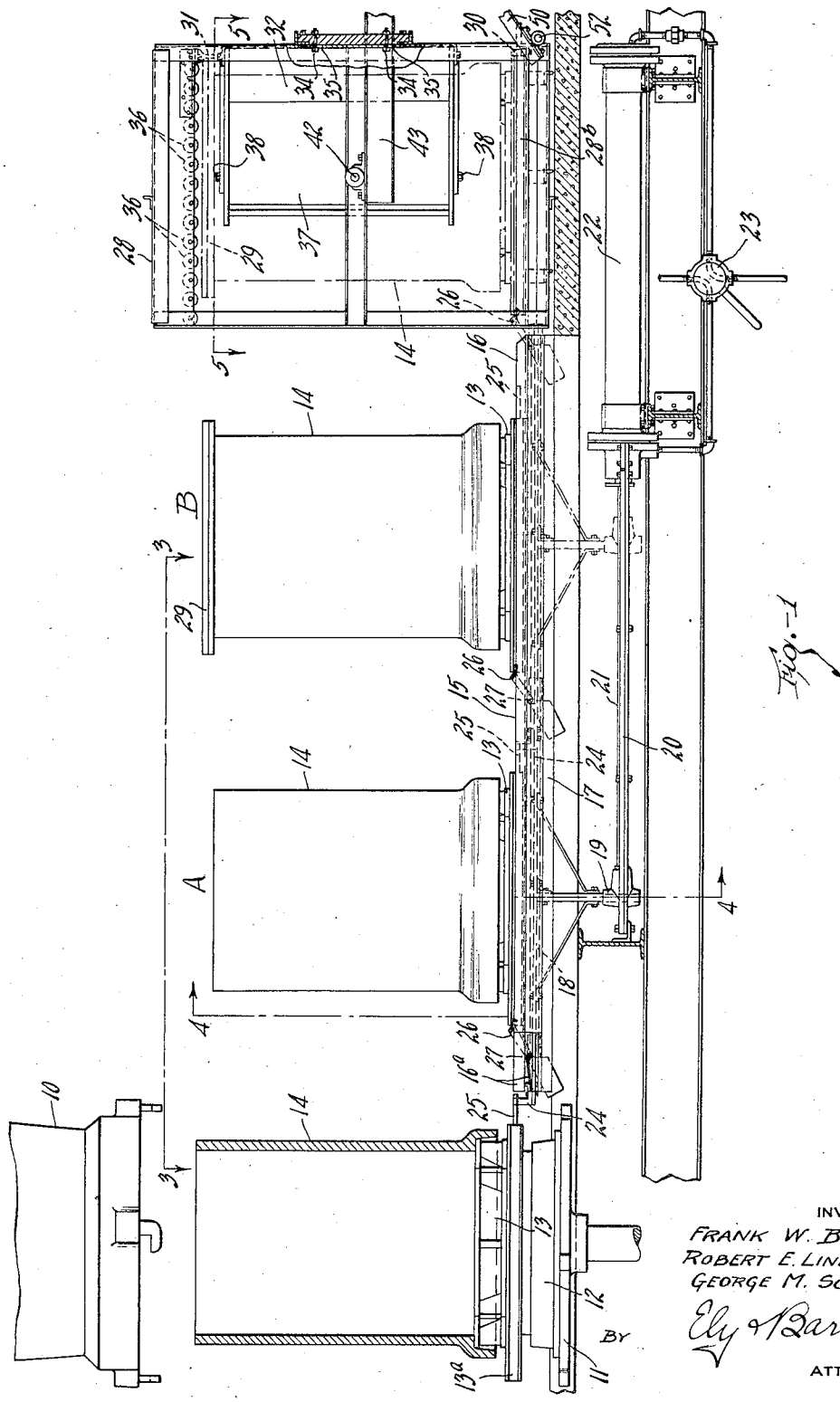
Figure 1 is a partial side elevation of a pipe forming press, conveyor and pipe turning device embodying the invention.
Figure 2:
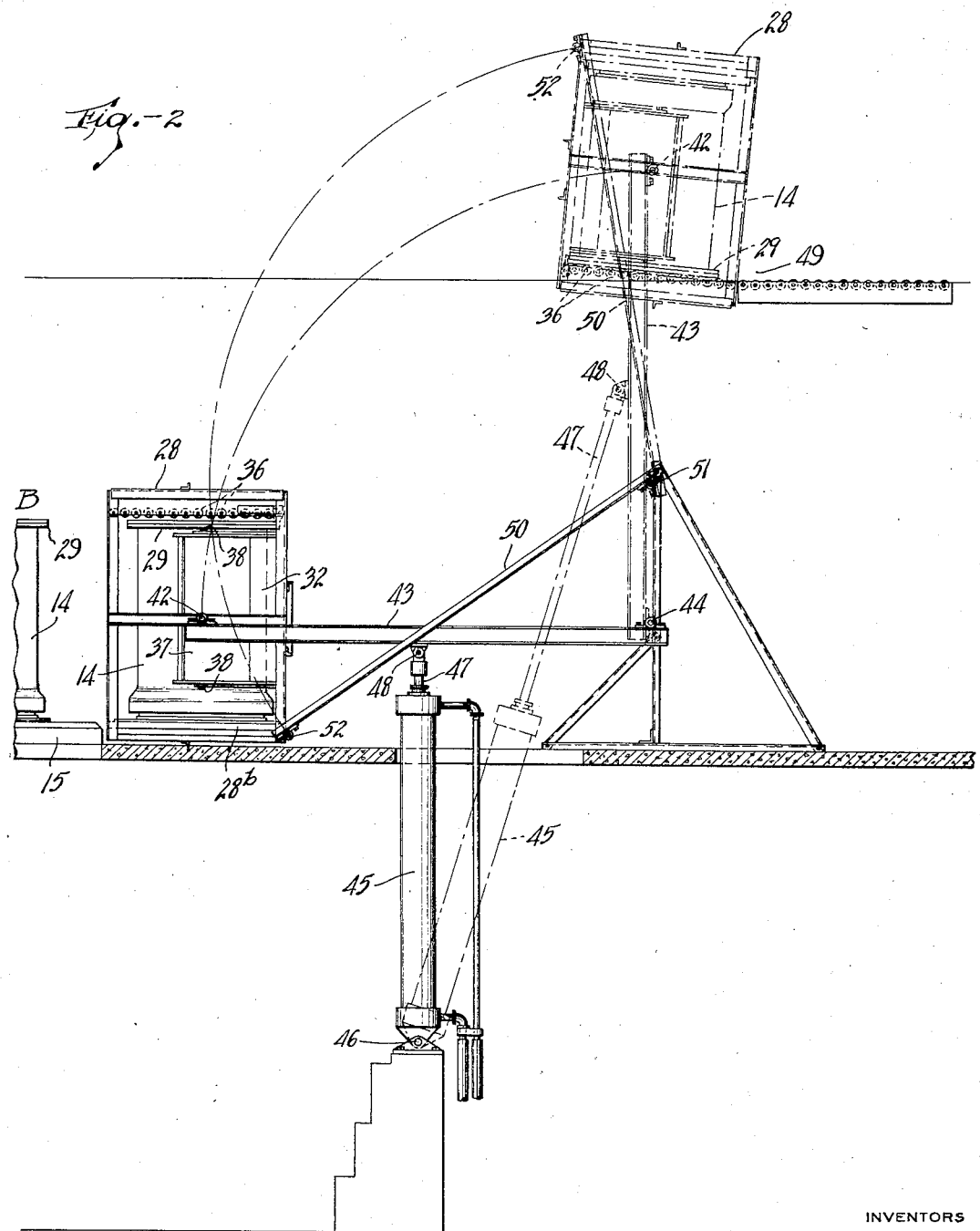
Figure 2 is an elevation on a reduced scale of the complete pipe turning device with the turner shown in full lines associated with the end of the conveyor and in dotted lines in its position for delivering the turned pipe to a point at which it may be removed from the turner.

Referring to the drawings, the numeral 10 designates a pipe forming press of any suitable design and having the usual platen 11 adapted to be raised into cooperation with the bottom of press 10 and which may provide the usual former 12 for shaping the end of the pipe in cooperation with the press. This type of press is old and well-known and does not require further description. In operation the platen 11 is raised and secured in the press. The platen is then lowered and a pallet 13 is placed on the platen which is again raised to carry the pallet 13 into supporting relation with the lower or bell-end of the pipe, the platen being lowered while the clay is forced out of the press die to form the pipe 14.

Figure 3:
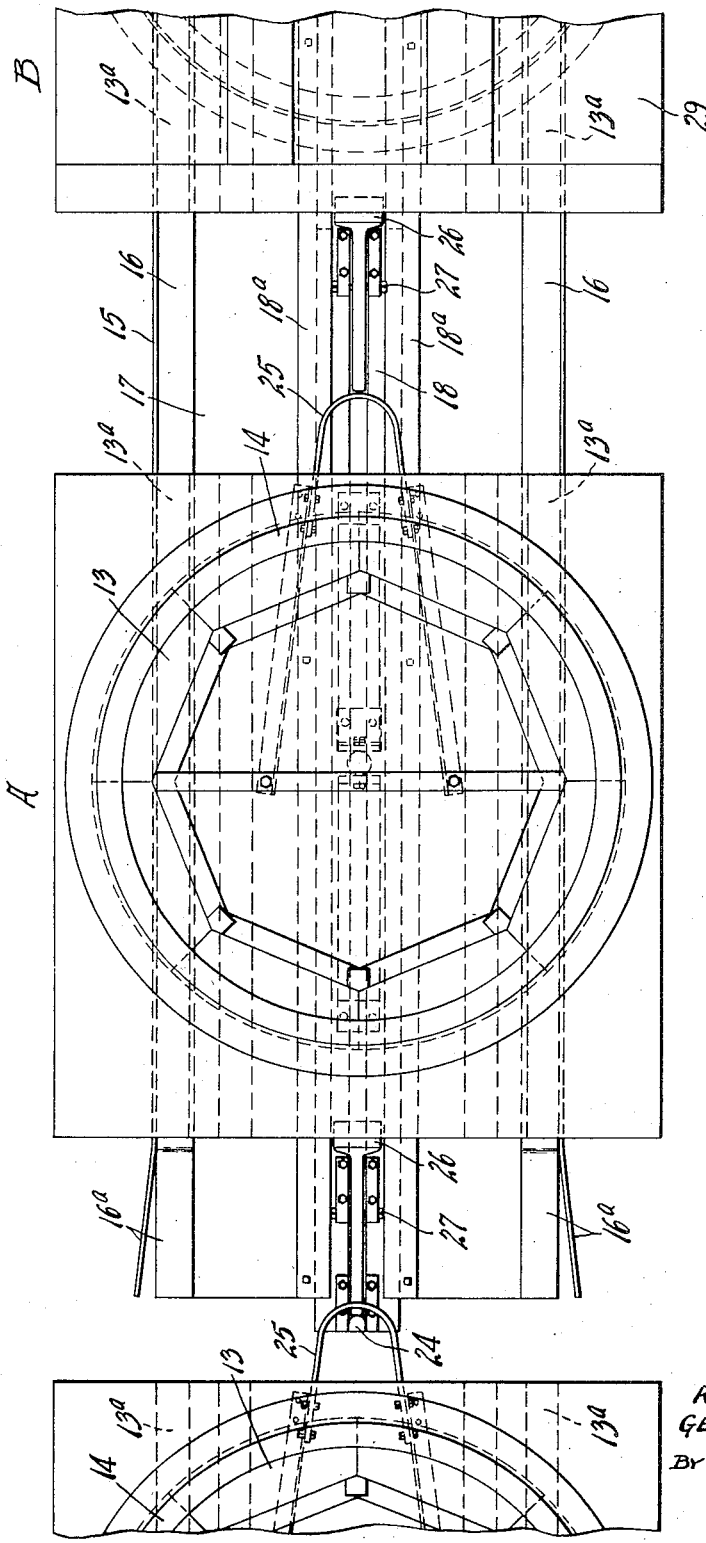
Figure 3 is an enlarged plan view from line 3—3 of Figure 1.
Figure 4:
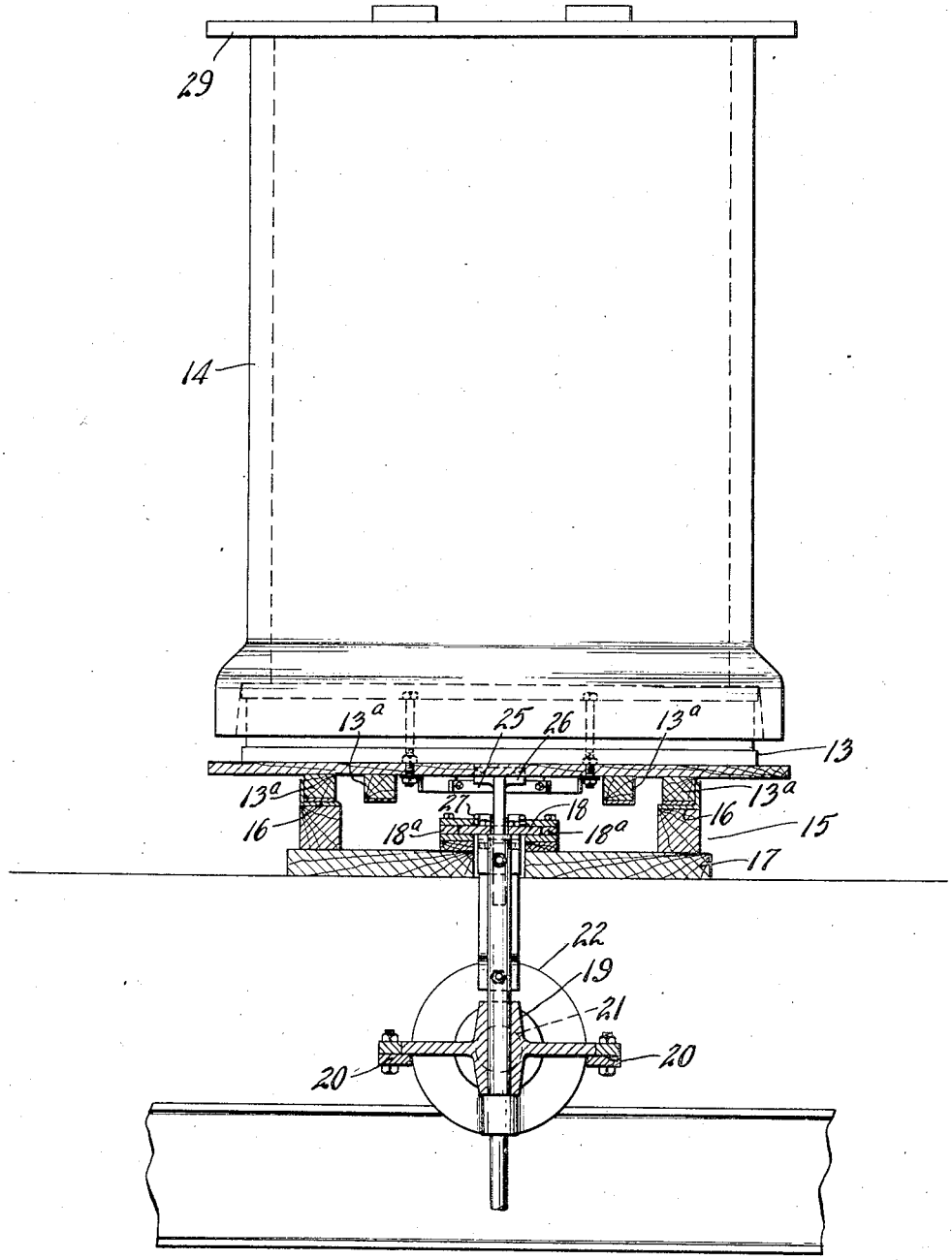
Figure 4 is an enlarged sectional view on line 4—4 of Figure 1.

Aligned with the platen 11 in its lowered position is a conveyor indicated generally by the numeral 15 and which may comprise rails 16, 16 mounted on a suitable base structure 17 slidably to receive the pallets 13 which are provided with runners 13ª, 13ª on the underside thereof. The rails 16 have side flanges as shown for embracing the outer runners 13ª of the pallet to guide the pallets along the conveyor, the side flanges diverging at the press end of the conveyor as shown at 16ª, 16ª (Figure 3) so as freely to receive the pallet runners therebetween. Associated with and beneath the rails 16 is a reciprocatory conveyor member 18 which may be slidably mounted in guides 18ª, 18ª and operated by a structure providing a reciprocable head 19 slidable on spaced rails 20, 20. Suitable means such as a plunger 21 in a double-acting fluid pressure operated cylinder 22 controlled by a suitable valve 23 may be provided to actuate the conveyor member 18 in either direction along the conveyor between the full and dotted line positions thereof as shown in Figure 1. On the end of the conveyor member adjacent the press there is provided a lug 24 and on the pallets 13 there are provided loops 25 projecting from an edge of the pallet, the lug 24 being so arranged on the conveyor member when in the full-line position of the conveyor as shown as to be vertically aligned with the loop 25 on a pallet descending from the press on the press platen whereby the loop will engage over the lug 24 as the press platen moves to its lowermost position as shown in Figure 1.

The reciprocatory member 18 of the conveyor also carries spaced dogs 26, 26 pivoted thereon as at 27 and normally urged upwardly by suitable yielding means such as weighted ends so as to project above the conveyor rails 16 in such positions as to engage and push a pallet 13 along the rails 16 away from the press when the conveyor member 18 is actuated from the full line position to the dotted line position as shown in Figure 1, said dogs being depressible by a pallet board upon retraction of the conveyor to the full line position shown and again swinging upwardly upon complete retraction of the conveyor member 18 whereby the pallet boards and the pipes thereon will be intermittently moved in succession along the conveyor to the stations indicated at A and B along the conveyor in which the pipes are illustrated in Figure 1 and also will be moved intermittently in succession into a turner receptacle frame indicated generally at 28. As many stations may be provided along the conveyor as desired, the stations A and B being shown provided, the former to place the pipe for trimming to length by a suitable cutter or trimmer (not shown) and the latter for placement of a pallet 29 on the top of the trimmed pipe preparatory to turning.

The turner includes the receptacle frame 28 which is open at its front as indicated at 28ᵃ to receive a pipe therein, the bottom of the receptacle frame being provided with means such as rails 28ᵇ, 28ᵇ aligned with rails 16, 16 to receive a pallet 13 carrying a pipe and a top pallet 29 from the conveyor 15. Suitable stops may be provided as at 30, 30 and at 31 at the back of the turner receptacle frame to limit inward movement of pallet boards and pipe therein.

The back of the turner receptacle is preferably provided with an improved cradle structure for supporting the pipe against distortion while being turned. This cradle comprises a rear member or frame 32 having a cylindrical pipe engaging surface at 33 of an arcuate extent not greater than and preferably substantially less than a semi-circumference. The rear member of the cradle is preferably secured to the rear of the turner receptacle frame by means of bolts 34, 34 extending through vertical slots 35, 35 which permit slight vertical shifting of the cradle under the action of gravity as the turner is operated. This provides for shifting of the top pallet 29 with the pipe onto a support which may be provided by a series of rollers 36, 36 at the top of the frame 28 on which the pipe may be discharged from the inverted turner frame.

The cradle includes a pair of side members 37, 37 pivoted on vertical axes as at 38, 38 and having inner arcuate surfaces at 39 adapted in cooperation with the fixed cradle member to embrace substantially more than a semi-circumference of the pipe. As shown in Figure 5, side members 37 are normally swung on their pivots as by leaf springs 40, 40 secured to the side members and connecting stops 41, 41 so that the outer portions of the side members diverge to permit passage of a pipe into the cradle, the inner edge portions of the side members being engaged by the entering pipe (see Figure 5) and the side members being swung into embracing relation about the pipe as illustrated in Figure 6.

The turner frame 28 may be pivotally mounted at 42, 42 on arms 43, 43 which may be pivoted as at 44 to swing the turner to any desired delivery point. Arms 43 may be swung by a fluid pressure cylinder 45 pivoted at 46 and having therein a double-acting plunger (not shown) connected by plunger rod 47 through a pivot 48 to the arm structure 43. The arm structure 43 is arranged to deliver the pipe to an upper floor as at 49. To turn the pipe-carrying receptacle as required to invert the pipe while the receptacle is moved from the conveyor to the point of delivery, links 50 pivoted at 51 are pivotally connected to the receptacle as at 52, the pivot connections being such distances from pivots 42 and 44 respectively as to cause the receptacle to rotate through about one hundred and eighty degrees as it is swung from the end of the conveyor 15 to the delivery point. It is understood that the arms 43 may be so arranged as to swing the turner receptacle from one point to another through an angle required or desired either to an upper or lower or the same level and that the arrangement of the links 50 may be modified as required to secure the required turning of the receptacle for any angle of swing.

It will be apparent from the foregoing that by the use of the present apparatus the pipes, as quickly as they are formed by the press 10 are intermittently conveyed in succession through stations A and B where they may be trimmed and the top pallets 29 applied and are intermittently pushed in succession into the turner receptacle 28. It will be understood that the turner is operated to turn the pipe and carry them to a point of delivery intermittently in succession during the interval when a pipe is being formed in the press and when the conveyor is retracted to the full line position shown ready to have a pallet board on the descending press plunger engaged with the conveyor lug.

By the use of the improved cradle shown, distortion of the plastic pipe while being turned is avoided, the turned pipe retaining the true roundness in which it was originally formed.

Modifications of the invention may be resorted to without departing from the spirit thereof or the scope of the appended claims.

What is claimed is:—

1. The combination with a press for forming plastic pipe or the like, of a pallet adapted to be carried on the press platen and on which the pipe may be formed, a conveyor associated with said press, said pallet and said conveyor having means interengaging upon movement of the press platen to a retracted position with the pallet and formed pipe thereon, and means for actuating said conveyor to remove the pallet with said formed pipe thereon from said platen through said interengaging means, said interengaging means comprising a loop on the pallet and a lug on the conveyor over which the loop may engage.

2. The combination with a press for making clay pipe or the like, of a conveyor for removing the pipe in succession from the press, a turner associated with the conveyor to receive the pipe in succession therefrom, said conveyor being adapted to move the pipe in succession into the turner, and a cradle in the turner for supporting the pipe as it is turned, said cradle including a rear section of an arcuate extent not greater than a semi-circle and two side sections adapted to cooperate with the rear section and of arcuate extents whereby the cradle will embrace more than half the circumference of the pipe, and means normally urging said side sections to positions with their outer edges diverged to receive the pipe therebetween and said side sections being supported to be moved into cooperation with the rear section to support the pipe by movement of the pipe into the cradle by said conveyor.

3. The combination with a press for making clay pipe or the like, of a conveyor for removing the pipe in succession from the press, a turner associated with the conveyor to receive the pipe in succession therefrom, said conveyor being adapted to move the pipe in succession into the turner, and a cradle in the turner for supporting the pipe as it is turned, said cradle comprising a plurality of sections each less than semi-circular in extent but cooperating to form a cradle of greater than semi-circular extent, and means normally holding said sections out of cooperation so as to permit movement of a pipe into the cradle, said sections being movable into cooperation by movement of the pipe into the cradle by said conveyor.

4. A pipe turner comprising a cradle comprising a central section and two side sections pivoted to swing between diverged positions to receive a pipe in the cradle and positions in cooperation with the central section, the cradle being of an arcuate extent greater than a semi-circumference of the pipe, and means normally urging the side sections to their diverged positions, said means yielding upon engagement of the pipe with the side sections as it is moved into the cradle.

5. A pipe turner comprising a cradle comprising a central section and two side sections mounted to move between divergent positions to receive a pipe in the cradle and positions in cooperation with the central section, the cradle being of an arcuate extent greater than a semi-circumference of the pipe, and means normally urging the side sections to their diverged positions, said means yielding upon engagement of the pipe with the side sections as it is moved into the cradle.

6. In a pipe turner, a cradle comprising a plurality of sections each of an arcuate extent less than a semi-circumference of the pipe to be supported thereon, and means for mounting said sections relatively movable to diverged positions permitting movement of a pipe into the cradle, said sections being relatively movable on said mounting means by movement of the pipe into the cradle to close about and support more than a semi-circumference of said pipe.

7. In a pipe turner, a cradle comprising a central section adapted to extend about an exterior portion of the pipe, and two side sections pivotally connected between their respective ends to said central section and each movable to diverged positions to receive therebetween and to engage external portions of the pipe circumferentially on opposite sides of said pivots.

8. In a pipe turner, a cradle comprising a central section adapted to extend about an exterior portion of the pipe, and two side sections pivotally connected substantially midway between their respective ends to said central section and each movable to diverged positions to receive therebetween and to engage external portions of the pipe circumferentially on opposite sides of said pivots.

9. In a pipe turner, a cradle comprising a central section adapted to extend about an exterior portion of the pipe and having free ends, and two side sections pivotally connected between their respective ends to the free ends of said central section and each movable to diverged positions to receive therebetween and to engage external portions of the pipe circumferentially on opposite sides of said pivots.

FRANK W. BLACK.
ROBERT E. LINDEMANN.
GEORGE M. SCHAULIN.